April 1, 1969     T. N. THIELE ET AL     3,436,654
GYRATORY CRUSHER CLEARANCE MEASURING MEANS HAVING
RESONANT COUPLING CIRCUITS
Filed Dec. 5, 1966

Inventors
Tom N. Thiele
Lester O. Gerlach
By R J Falkowski
Attorney

United States Patent Office 3,436,654
Patented Apr. 1, 1969

3,436,654
GYRATORY CRUSHER CLEARANCE MEASURING MEANS HAVING RESONANT COUPLING CIRCUITS
Tom N. Thiele, Milwaukee, and Lester O. Gerlach, Hales Corners, Wis., assignors to Allis-Chalmers Manufacturing Company, Milwaukee, Wis.
Filed Dec. 5, 1966, Ser. No. 599,065
Int. Cl. G01r 27/26
U.S. Cl. 324—61    15 Claims

ABSTRACT OF THE DISCLOSURE

A gyratory crusher having an electronic gap measuring circuit connected to the crushing surfaces of the crusher and to an insulated foil surrounding the outer crushing surface. The foil is connected to ground and a high frequency signal is applied between the foil and the surfaces. Input and output resonant circuits are connected and adjusted to obtain maximum power transfer. The input and output signals are tapped from the two resonant circuits and after rectification and filtering are received by a differential amplifier as inputs. The differential amplifier output indicates the capacitance, and therefore the clearance, between the crushing surfaces.

---

Figure 1:
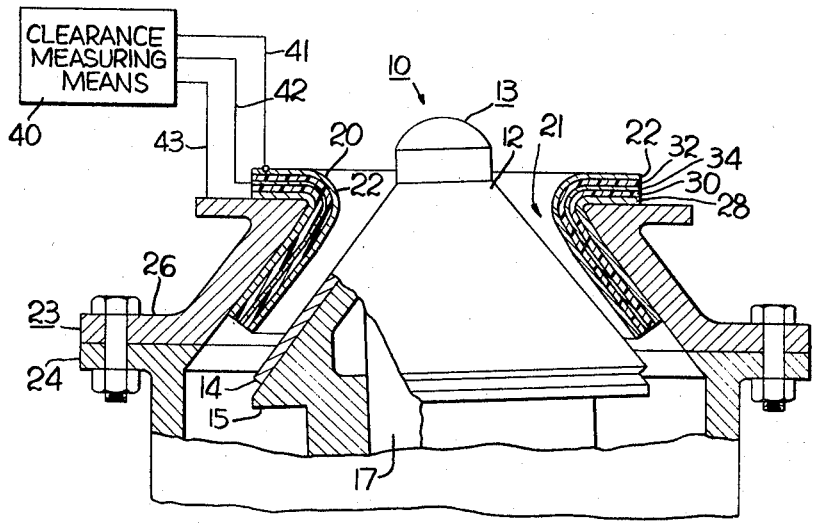

This invention relates to a means or system for measuring the clearance between the crushing or grinding surfaces of a device such as a gyratory crusher. Particularly, it relates to an improved means for measuring the capacitance between these surfaces and relating the capacitance to the clearance.

This invention is applicable to devices or machines, such as gyratory crushers, that require measuring of the clearance or separation distance between proximate surfaces in order to adjust and maintain the separation clearance within certain limits.

Since the liners used as the crushing surfaces on devices such as gyratory crushers often wear rapidly, it is difficult to maintain a relatively constant clearance or to provide a continuous check of the clearance during operation. It is possible to use capacitance measuring circuits that continuously provide an indication of the capacitance between the crushing surfaces. However, capacitance measuring circuits accordance to the art prior to this invention have several inherent problems. For example, such circuits are usually unstable, tend to oscillate, and have an inherent phase shift. Because the frequency utilized has to be lower than desirable for practical operation, the material crushed may greatly affect the capacitance relationship between the crushing surfaces. Capacitance measuring means according to this invention greatly decreases and often completely eliminates these undesirable effects.

According to this invention, a foil is inserted between one of the crushing surfaces and the structure of a crusher. The foil is grounded and an electrical signal is supplied between ground and the crusher surfaces. The capacitance between the surfaces is measured by using a high frequency source and a measuring circuit connected to the surfaces through tuned resonant circuits. The resonant circuits are adjustable to provide for matching of impedances. The input and output signals are rectified and filtered to eliminate phase shift problems and the resulting signals are compared to indicate the capacitance.

The objects of this invention are to provide a new and improved gyratory crusher; to provide electrical means for continuously indicating the spacing between two proximate surfaces of a device such as a gyratory crusher; to provide capacitance measuring means for indicating the distance between the crushing surfaces of a device such as a gyratory crusher that includes means for compensating for stray or parasitic capacitance present in the device; to provide a new and improved capacitance measuring means for measuring the clearance between crushing surfaces of gyratory crushers or similar devices that is essentially unaffected by, or can be adjusted to substantially eliminate the effects of, the electrical characteristics of the material being crushed; and to provide capacitance measuring means for gyratory crushers or similar devices that can operate at high frequencies with exceptional stability and minimum power requirements.

Figure 2:
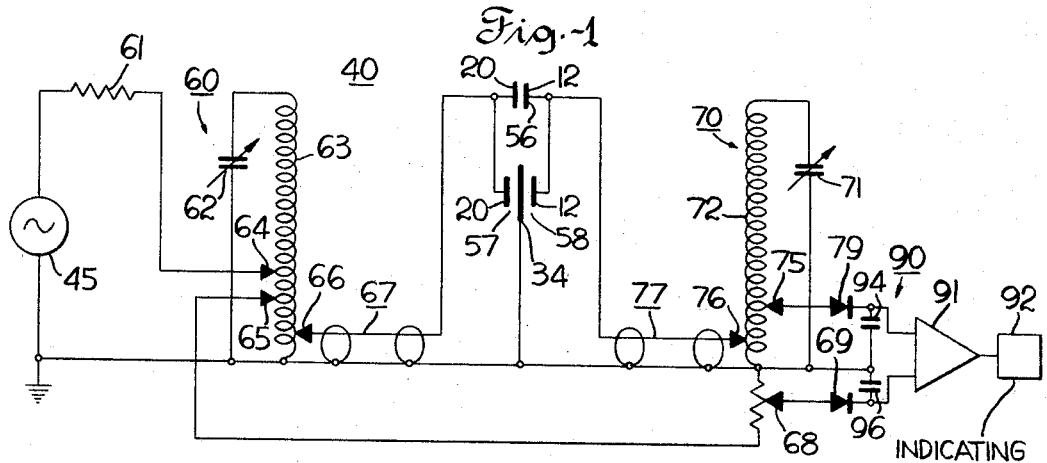

FIG. 1 is a simplified drawing of a gyratory crusher embodying this invention; and FIG. 2 is a schematic representation of the crusher surfaces and clearance measuring means shown in FIG. 1.

Referring to FIG. 1, a gyratory crusher 10 has a first crushing surface 12 created by a rotatable generally conical crushing head 13 made up generally of a liner 14, a base 15 and a shaft 17 eccentrically related to a stationary second crushing surface 20 created by a truncated conical concave liner 22 surrounding the conical crushing head. Concave liner 22 is supported by a conical shell structure 23, comprising a base 24 and a conical shell 26, a conical inner liner 28, a conical inner insulator 30, a conical conductor, electrode or foil 34, and a conical outer insulator 32 adjacent liner 22. A crushing chamber 21 is created between first crushing surface 12 and second crushing surface 20.

A clearance measuring means 40 is connected to the crusher and comprises a first conductor 41 connected to liner 22, a second conductor 42 connected to conical electrode 34, and a third conductor 43 connected to shell structure 23. Conductor 43 is electrically connected to liner 14 and surface 12 through conical shell structure 23, the supporting structure for the crusher (not fully shown), shaft 17 and base 15. In most applications this is an adequate electrical connection. However, in some applications it may be desirable to connect conductor 43 directly to liner 14 through some device such as a slip ring and brush connector.

The purpose of the clearance measuring means is to measure the distance between liner 22 and liner 14, or, more accurately, between crushing surface 20 and crushing surfaces 12. This is accomplished by measuring the capacitance between surfaces 20 and 12. Since the mechanical structure of the crusher has many places where insulation separates two conductors, there are many stray or parasitic capacitances present. These capacitances are relatively large compared to the capacitance between surfaces 20 and 12 and they must, therefore, be eliminated or compensated for in order to get accurate results. The manner in which this is accomplished can be explained by considering the circuit of measuring means 40 as it is schematically shown in FIG. 2 where similar numerals are provided for parts similar to the parts shown in FIG. 1.

Referring to FIG. 2, the capacitances between the crushing surfaces 20 and 12 are shown schematically with a capacitance 56 indicating the capacitance occurring between surface 20 and 12 across the gap created by crushing chamber 21, a capacitance 57 indicating the capacitance appearing between surface 20 and electrode 34, and a capacitance 58 indicating the capacitance between surface 12 and electrode 34. As described with reference to FIG. 1, electrode 34 is an insulated plate or foil between surface 22 and the remainder of the crusher structure and is connected to ground or a point of common potential.

Clearance measuring means 40 comprises an alternating electrical energy source 45, input connecting means including an input resonant circuit 60, output connecting means including an output resonant circuit 70, an output measuring means 90 including a differential amplifier 91, and an indicating means 92.

The input connecting means connects source 45 across first surface 20 and electrode 34 to supply electrical energy to surface 20 and electrode 34 and comprises a resistor 61; an adjustable capacitance such as a capacitor 62; and an adjustable inductance such as a coil 63 having a tap 64 connected to resistor 61, a tap 65 connected to output measuring means 90, and a tap 66 connected to crusher surface 20 and electrode 34 through a coaxial cable 67.

The output connecting means is connected across second surface 12 and electrode 34 and comprises an adjustable capacitance such as a capacitor 71, and an adjustable inductance such as a coil 72 having a tap 75 connected to output measuring means 90 and a tap 76 connected to crusher surface 12 and electrode 34 through a coaxial cable 77.

Input resonant circuit 60 is adjusted to resonate at the source frequency by adjusting capacitor 62 and tap 64, and to match impedance with coaxial cable 67 and the capacitance between the crusher surfaces by adjusting tap 66.

Output resonant circuit 70 is adjusted to resonate at the source frequency by adjusting capacitance 71 and tap 75, and to match impedance with the capacitance between the crusher surfaces and coaxial cable 77 by adjusting tap 76.

Output measuring means 90 is connected to the input connecting means and the output connecting means for measuring the potential between surface 20 and surface 12 and comprises differential amplifier 91, diodes 69 and 79, a potentiometer 68, and capacitors 94 and 96. Differential amplifier 91 is connected through diode 69 and potentiometer 68 to tap 65 and through diode 79 to tap 75.. Taps 65 and 75 are adjusted to initially balance the circuits and potentiometer 68 is adjusted to balance the circuits at the desired clearance between the crushing surfaces. Amplifier 91 produces a signal varying as a function of the potential between surface 20 and surface 12. The inputs to amplifier 91 are rectified by a rectifying means such as diodes 69 and 79 and filtered by a filtering means such as capacitors 94 and 96 to eliminate the effect of any phase shift that may occur.

Indicating means 92 receives the signal from amplifier 91 and provides an indication of the capacitance between surface 20 and surface 12.

In operation, source 45 provides electrical energy at a selected frequency through resonant circuit 60 and 70 to provide a rectified and filtered input to differential amplifier 91. By utilizing the two resonant circuits and by rectifying and filtering the output of the resonant circuits, phase shift and the tendency to oscillate are eliminated, power transfer is efficient, and a high frequency may be used to thereby decrease or eliminate the electrical effect of the material in gap 21. If the dielectric constant of the material is a significant factor, potentiometer 68 may be adjusted with the material in the crusher to obtain optimum results. This circuit makes it possible to obtain a high Q in the tuned circuits to eliminate the effect of spurious signals, noise, and oscillations; and the impedance matching adjustments available enable the resonant circuits to be located at a greater distance from the crusher.

To actually measure the clearance, a correlation is first made between the measured capacitance as indicated by indicating means 92 and the actual clearance between the crushing surfaces. Since the capacitance is inversely proportional to the distance between the crushing surfaces and since the capacitance effect occurring other than through gap 21 is eliminated by the effect of the circuit and electrical isolation provided by electrode 34, the distance between the surfaces through gap 21 solely affects the signal from amplifier 91.

Indicating means 92 may be a meter indicating the difference between the two inputs, it may be a null circuit the provides an output to an automatic control system, or it may be any combination of automatic and manually operated control systems that would enable or provide automatic or manual adjustment of gap 21 between surfaces 20 and 12. An example of a specific circuit is a meter with potentiometer 68 adjusted so that the meter indicates zero at the desired clearance. When the capacitance of crushing gap 21 becomes smaller or larger relative to the correlated zero point, the meter indication will be positive or negative indicating whether the gap is smaller or larger than desired. This can be read from a dial by an operator or it can provide an output to control an automatic control device that responds to the amplitude and polarity of the signal to automatically adjust gap 21.

The embodiments of the invention in which an exclusive property or privilege is claimed are defined as follows:

1. A clearance measuring system for a conductive gyratory crusher having spaced apart, relatively movable first and second crushing surfaces, said second crushing surface being electrically connected to said crusher and said first and second crushing surfaces forming a relatively small variable capacitor therebetween through the air gap separating them, said system comprising:

insulating means including an extended conductive electrode and insulation covering both surfaces of said electrode disposed between said first crushing surface and said crusher, said first crushing surface and said crusher forming a relatively large shunt capacitor effectively in parallel with said variable air gap capacitor;

an alternating electrical energy source having a predetermined frequency;

input connecting means for connecting the source to supply electrical energy across said first crushing surface and the electrode;

output connecting means connected across the second crushing surface and the electrode;

output measuring means connected to the input connecting means and the output connecting means for measuring the potential between the first crushing surface and the second crushing surface to produce a signal varying as a function of the potential between said first and second crushing surfaces; and indicating means responsive to the signal for providing an indication of the capacitance of said variable air gap capacitor between the first and second crushing surfaces.

2. A clearance measuring system according to claim 1 wherein the input connecting means comprises an input resonant circuit adjusted to resonate at the source frequency and the output connecting means comprises an output resonant circuit adjusted to resonate at the source frequency.

3. A clearance measuring system according to claim 2 wherein the input resonant circuit comprises an adjustable capacitor connected across an inductor having an adjustable first tap connected to the source and an adjustable second tap, and means connecting said second tap to the first crushing surface; and wherein the output resonant circuit comprises an adjustable capacitor connected across an inductor having an adjustable first tap, and means connecting said first tap of said output resonant circuit to the second crushing surface.

4. A clearance measuring system according to claim 2 wherein the output measuring means comprises means for rectifying and means for filtering the potentials from the input connecting means and output connecting means.

5. A clearance measuring system according to claim 4 wherein the output measuring means comprises: a differential amplifier for producing the signal, means applying a measure of the potential at the first crushing surface from the input connecting means to an input of said differential amplifier including a diode for rectifying and a capacitor for filtering said measure of said potential at said first surface, and means connecting a measure of the potential at the second crushing surface from said output connecting means to another input of said differential amplifier including a diode for rectifying and a capacitor for filtering said measure of said potential at said second surface.

6. A clearance measuring system according to claim 1 wherein the output measuring means comprises means for rectifying and means for filtering the potentials from the input connecting means and the output connecting means.

7. A clearance measuring system according to claim 6 wherein the output measuring means comprises: a differential amplifier for producing the signal, means applying a measure of the potential at the first crushing surface from the input connecting means to an input of said differential amplifier, and means connecting a measure of the potential at the second crushing surface from said output connecting means to another input of said differential amplifier.

8. A clearance measuring system according to claim 1 wherein:
the input connecting means comprises an adjustable capacitor connected across an inductor to form the input resonant circuit, said inductor having first, second, and third adjustable taps with said first tap connected to the source, and a coaxial cable connecting the second tap to the first surface;
the output connecting means comprises an adjustable capacitor connected across an inductor to form the output resonant circuit, said inductor having first and second adjustable taps, and a coaxial cable connecting said first tap of said output connecting means to the second surface, and
the output measuring means comprises a differential amplifier having two inputs for producing a signal proportional to the potential difference of the inputs and indicating by polarity the relative magnitude of the two inputs, means connecting said third tap of said input connecting means to one input of said differential amplifier through a first rectifying and filtering means, and means connecting said second tap of said output connecting means to the other input of said differential amplifier through a second rectifying and filtering means.

9. A clearance measuring system for a gyratory crusher comprising:
a first crushing surface and a second crushing surface, said first crushing surface surrounding and spaced apart from said second surface;
a third surface surrounding and adjacent said first surface, said third surface including an electrode and a pair of insulators covering both sides of said electrode;
a fourth surface surrounding and adjacent said third surface;
means electrically connecting said second and fourth surfaces;
an alternating electrical energy source having a predetermined frequency;
input connecting means for connecting the source to supply electrical energy across said first surface and said electrode;
output measuring means connected across said input and said output connecting means for measuring the potential between said first surface and said second surface to produce a signal varying as a function of the potential between said first and second surfaces; and
indicating means responsive to the signal for providing an indication of the capacitance between said first and second surfaces.

10. Clearance measuring means for a conductive gyratory crusher provided with relatively movable first and second crushing surfaces, said second crushing surface being electrically connected to said crusher and said first and second crushing surfaces forming a relatively small variable capacitor therebetween through the air gap separating them,
insulating means including an extended conductive electrode and insulation covering both surfaces of said electrode disposed between said first crushing surface and said crusher, said first crushing surface and said crusher forming a relatively large shunt capacitor effectively in parallel with said variable air gap capacitor,
an alternating current source coupled across said first crushing surface and said electrode,
first means for detecting the voltage drop between said first crushing surface and said electrode,
second means for detecting the voltage drop between said second crushing surface and said electrode,
differential comparing means coupled to said first detecting means and to said second detecting means, and
indicating means responsive to the output of said differential comparing means, whereby change in clearance between said first and second crushing surfaces varies the current through said variable capacitor, the voltage drop seen by said second detecting means, and the output of said differential comparing means.

11. Clearance measuring in accordance with claim 10 wherein said alternating current source generates a high frequency and including input, high Q, resonant circuit means tuned to the frequency of said alternating current source for coupling said alternating current source across said first crushing surface and said electrode and wherein said second detecting means includes output, high Q, resonant circuit means tuned to the frequency of said alternating current source, whereby the amount of power required of said alternating current source to drive current through said shunt capacitor is reduced.

12. Clearance measuring means in accordance with claim 11 and including a first coaxial cable disposed between said input resonant circuit means and said first crushing surface and a second coaxial cable disposed between said second crushing circuit and said output resonant circuit means.

13. Clearance measuring means in accordance with claim 12 wherein said first crushing surface is on a concave liner having the shape of a truncated cone, said second crushing surface is on a centrally disposed gyratory crushing head eccentrically located within said liner, said crusher has a concave shell portion surrounding said liner, and said insulating means including said electrode is disposed between said shell portion and said liner.

14. Clearance measuring means in accordance with claim 12 wherein each of said input and output resonant circuit means includes a variable capacitor and an inductor in parallel with said variable capacitor having first and second adjustable taps, said first and second adjustable taps of said input resonant circuit means being coupled respectively to said alternating current source and to said first coaxial cable, said first and second adjustable taps of said output circuit resonant means being coupled respectively to said second coaxial cable and to said differential comparing means.

15. Clearance measuring means in accordance with claim 14 wherein said differential comparing means is a differential amplifier, said variable inductor of said input resonant circuit means has a third tap, and said first detecting means includes a diode and a filter between said third tap and one input terminal of said differential amplifier.

References Cited

UNITED STATES PATENTS

| | | | |
|---|---|---|---|
| 2,800,628 | 7/1957 | Stinson et al. | 324—61 |
| 2,866,337 | 12/1958 | Minneman | 324—61 XR |
| 2,882,728 | 4/1959 | Zito | 324—61 XR |
| 3,019,651 | 2/1962 | Hermanson | 324—61 XR |

RUDOLPH V. ROLINEC, *Primary Examiner.*

E. E. KUBASIEWICZ, *Assistant Examiner.*